United States Patent [19] [11] 4,249,330
Chioffe [45] Feb. 10, 1981

[54] MEDICAL PENDANT

[76] Inventor: Joseph J. Chioffe, 811 Beckman Dr., N. Bellmore, N.Y. 11710

[21] Appl. No.: 107,269

[22] Filed: Dec. 26, 1979

Related U.S. Application Data

[63] Continuation-in-part of Ser. No. 901,444, May 1, 1978, abandoned.

[51] Int. Cl.[3] ........ G02B 27/02
[52] U.S. Cl. ........ 40/363; 63/18
[58] Field of Search ........ 40/361-365, 40/22, 10 D, 10 R, 21 C, 542; 63/18, 19, 23, 1 R, 2; 350/140

[56] References Cited

U.S. PATENT DOCUMENTS

| | | | |
|---|---|---|---|
| 271,838 | 2/1883 | Gould | 40/363 |
| 302,722 | 7/1884 | Gould | 63/19 |
| 3,180,042 | 4/1965 | Destal | 63/18 X |
| 4,122,619 | 10/1978 | Kruger | 63/18 X |

FOREIGN PATENT DOCUMENTS

| | | | |
|---|---|---|---|
| 749351 | 1/1945 | Fed. Rep. of Germany | 40/363 |
| 249713 | 4/1926 | United Kingdom | 40/542 |

*Primary Examiner*—John F. Pitrelli
*Attorney, Agent, or Firm*—Russell G. Pelton

[57] ABSTRACT

A pendant type capsule is provided to be worn on the person as jewelry and having within an air and water-tight cavity therewithin a small microfilm containing the medical history or medical and personal characteristics of the person carrying or wearing the jewerly together with a suitable light sensitive backing for or adjacent to the film to provide lighting characteristics, and a lens at the other end of the cavity, with the film and lens fixedly mounted to provide fixed focus for observing the medical history of the person without the necessity of using other devices.

2 Claims, 6 Drawing Figures

MEDICAL PENDANT

This application is a continuation-in-Part of application, Ser. No. 901,444, filed May 1, 1978 now abandoned.

Many persons throughout the world today carry on their person or in their clothing, cards or other suitable identification which also contain information with respect to any particular medical sensitivity or weakness which that person may have, such as for example, an allergy to certain drugs; a heart condition, or diabetes. In addition, many people carry a card which states the type of blood in the event that a blood transfusion should be necessary. It becomes increasingly apparent that the more complete medical history any person has which is readily available to any doctor in the event of any medical emergency, no matter where it occurs, the better treatment can be given by the doctor and the greater protection given to the person. Immediate medical history knowledge may often be the difference between life and death or other serious illness or injury.

While cards or other similar writings carrying such medical identification may be carried, the frailities of human beings throughout the world is such that cards often are not carried because there is no convenient place on particular occasions particularly when dress is important. Also, the card or writing may be left in another pocket, wallet or pocketbook and not available at the time of need.

Other devices for wearing or carrying on the person have been suggested but the vanity of human beings is such that often devices for this purpose are not sufficiently appealing in appearance so as to be worn on all occasions or even may be worn in such a way as to be hidden from sight. Some former devices, if small enough to be carried, often require removal to a further viewing instrument in order to properly read the material on the film or other writing carried by the device.

A foldable pendant also has been suggested but this has the mentioned disadvantages: lack of appearance for dresswear, exposure of the lens to damage by scratching, etc., movable or foldable pieces which often result in improper focus or breakage of parts such as hinge parts, etc. and finally, locking means which may interfere with proper operation in the event of emergency because the locket cannot be opened at the right moment. Further, such a vulnerable device may pop open at an inappropriate moment and thus embarrass the wearer, particularly if it is a dress occasion.

Accordingly, it is among the objects of this invention to provide an article or device to be worn or carried on the person and having the appearance of a piece of jewelry so as to be attractive yet provide suitable fixed focus viewing means readily available to any other person in the event of an emergency, such device being viewable on the spot there being no necessity of resorting to another instrument for assistance. Such a device may be in the form of a pedant to be worn about the neck on a chain or a pendant to be attached to a bracelet or other similar jewelry and which may be attractive unobtrusively and yet completely medically useful. It is water and dirt proof so as to be free from damage and free of interference with viewing characteristics.

Figure 1:
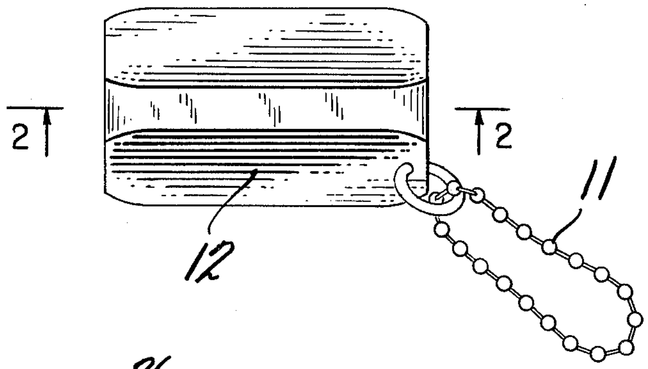
FIG. 1 shows the pendant suitable for wearing or carrying for example as a pendant on a chain.

Referring now more particularly to FIG. 1, it may be seen that the jewelry pendant in accordance with this invention comprises an elongated but small metal capsule 12 which may be of any material suitable as a piece of jewelry. It may be, for instance, a metal piece with gold or other precious metal coating or any alloy which is sufficiently hard to retain shape and hold parts imbedded therein and yet present an esthetically pleasing appearance of jewelry.

In the form illustrated in FIG. 1, a small necklace type of chain 11 is fastened to a loop at one end of the capsule 12 so that it may be worn around the neck as a necklace pendant. Similarly, the capsule 12 may be attached to a bracelet or other jewelry as a pendant. It is desirable that it be pleasing in appearance as jewelry to be worn on a person so as always to be seen. In this way in the event of an emergency, this particular piece of jewelry can be recognized immediately and thus available to any qualified medical person in the event of an emergency when a person is in need of medical assistance and unable to give information or instructions as to medical history.

The exterior of the capsule 12 may be of any desired shape such as rectangular or cylindrical. The interior 16 is hollowed out longitudinally from one end to the other leaving open ends 17 and 18. The hollowed out interior or opening 16 preferably is substantially cylindrical or circular in cross section for reasons hereinafter described.

Figure 2:
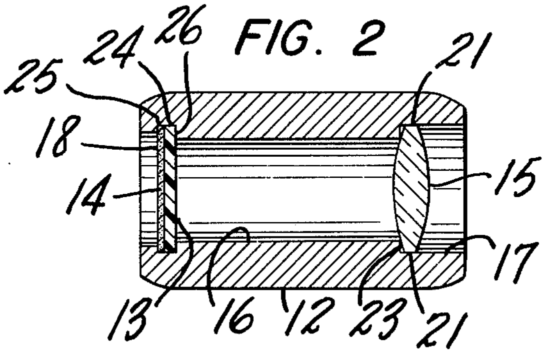
FIG. 2 is a cross-sectional view through 2—2 of FIG. 1 and showing the location of the various parts comprising the interior of the pendant.
Figure 3:
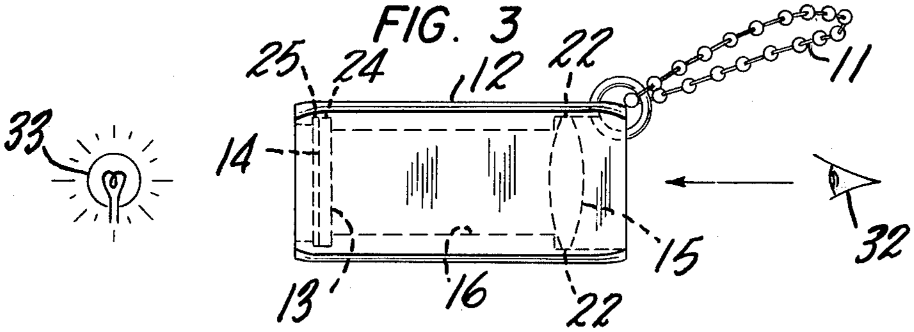
FIG. 3 shows the pendant as it may be viewed and thus in use to provide the desired medical information.
Figure 4:
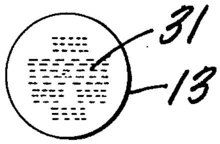
FIG. 4 is an enlarged view illustrating the film and arrangement of terms for medical history.

As may be seen in FIGS. 2 and 3 near one end 17 of the capsule 12 but recessed from that end so as to be protected, there may be embedded a small amplifying lens 15 preferably circular. The circular edge 21 of the lens may be inserted or mounted vertically within a circumferential groove 22 in the cavity (FIG. 3), or between suitable shoulder supports 23 therein (FIG. 2). Such a rigid mounting is necessary to keep the lens fixed rigidly in position notwithstanding bumps to which the pendant may be subjected when worn as jewelry on the person.

The edge 21 of the lens is embedded in epoxy or other sealing material necessary to create an air and moisture-tight seal within the cavity.

The capsule 12 is elongated so that a film or microfilm 13 containing the medical information may be located within the cylindrical cavity 16 precisely and accurately vertically at the focal point of the lens 15. The film is secured in a way to be nonmovable so as to provide a fixed focus viewing device not subject to movement or changes.

The circular edge 24 of the film may be inserted in an angular groove 25 or suitable shoulder supports 26 within the cavity 16. The film may be attached to, or be positioned adjacent to a rigid backing 14 of light transmitting or light producing material. The backing 14 may be translucent so as to spread light passing there-through evenly over the area of the film or it may be of luminescent material to produce light evenly over the film.

The film 13 and its backing 14 are fixedly mounted so as to be nonmovable. Since the film is at the focal point of the lens 15 and since the lens also is not movable, the capsule 12 provides fixed focused viewing with no moving parts.

Figure 5:
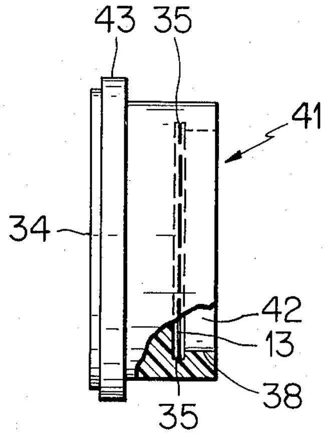
FIG. 5 shows a module which contains the medical film which module may be snapped into place in the jewel capsule and FIG. 6 is a sectional view of a modified capsule designed to contain the module of FIG. 5.

In the preferred form the film 13 is mounted in a separate module 41 shown in FIG. 5. In this form the module may consist of a small disk slightly larger than the film itself and may readily be mounted within the capsule 12 by snapping the module in place.

Figure 6:
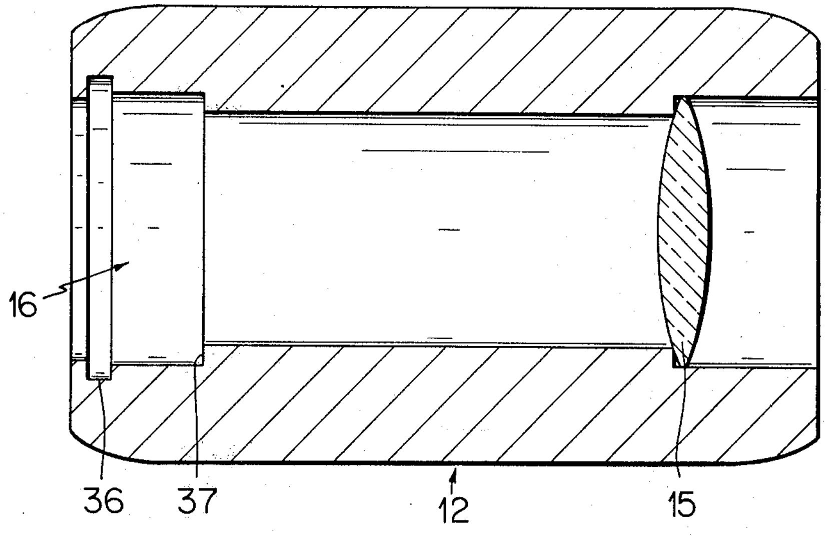

In this preferred form one end of the capsule 12 opposite the lens 15 is open as may be seen in FIG. 6. Near this open end the diameter of the cylindrical cavity 16 therein increases to form an annular shoulder 37. Immediately adjacent the open end there is an annular groove 36.

The module 41 is cylindrical with a cylindrical cavity 42 therein. One end of the cavity is closed by a translusent end panel 34 which may be a unitary part of the module.

Immediately adjacent the closed end of the module 41 there is an annular ridge 43. The diameter of this ridge 43 is equal to the inner diameter of the groove 36 with the capsule 12. The outer diameter of the module 41 and the distance between the ridge 43 and the end shoulder 38 is equal to the diameter of the cavity 16 in the capsule 12 and the distance between the inner groove 36 and the inner shoulder 37 respectively. The inner diameter 42 of the module 41 is equal to the inner diameter of the cavity 16 in the capsule 12 between the lens 15 and the shoulder 37. Thus, the module 41 fits snugly within the end of the capsule 12 when snapped into place therein and forms a cavity of uniform cross section between the lens and the film.

An annular groove 35 is positioned interiorly within the module 41 at the focal point of the lens 15 when the module is snapped into the end of the capsule 12. The film 13 having the medical information thereon is circular and may be snapped in place in the groove 35 where it remains fixed and thereafter immovable. At the same time the film is sealed against dirt and moisture. When the module 41 is in position in the capsule 12, the shoulder 38 of the end of the module abuts the corresponding shoulder 37 in the capsule so as to control accurately the positioning of the film 13 at the focal point of the lens 15.

It is to be noted that both the lens 15 and the film 14 are circular. It has been found that the circular film 13 and circular lens 15 give the most satisfactory results for an air and moisture proof cavity and a fixed focus positioning of the lens 15 and the film 13. Similarly therefore the interior cavity 16 of the capsule 12 in which the lens 15 and the film 13 are mounted is cylindrical or circular in cross section.

It is necessry that the capsule 12 be air and water tight to serve satisfactorily in providing the medical information when necessry in an emergency. Any dust or moisture within the capsule would interfere with the reading of the microfilm 13 and the ready determination of the medical information which, if not so easily read, would only create complications at a time of emergency and also lead possibly to a misinterpretation of some part of the information to the detriment of the patient.

The film 13 is of any well known type. The contents can be photographically reproduced thereon any known way. The precise layout of the information or medical terms 31 on the film 13 may vary but it should contain important terms or items as name, address, birth date, next of kin, etc. of the person wearing the jewelry and other information such as eye specification, glasses needed, whether there be contact lens, the blood type and any special disease or disorders such as heart problems, kidney, liver, insulin, diabetes, etc. Allergies also should be recorded. The religion of the wearer may be desireable.

In addition, there may be listed any number desired of various medical terms, including drugs or other medicines currently being used.

The medical information may be observed readily as illustrated on FIG. 3. The end of the capsule 12 bearing the lens 15 is brought to the eye 32 and the capsule 12 directed to any source of light 33. Since the film 13 is fixedly positioned at the focal point of the lens 15 and the translucent or luminescent backing 14 or 34 passes light evenly across the area of the film all information can easily be readable without the necessity of resorting to any other observation device or movement of the lens. Thus, in an emergency a doctor or other skilled personnel can quickly obtain the background medical history for proper treatment.

The preferred form of the capsule has been described as comprising a circular lens and a circular film within a cylindrical cavity. It has been found, however, that while best results are obtained by using the circular and cylindrical forms, results which may be considered satisfactory can also be obtained by using a cavity substantially square or rectangular in cross section and a substantially square or rectangular film and lens or any combination thereof.

While precious metals and alloys are described as material for the capsule, plastics are also available which have sufficient hardness or strength to support the lens and film rigidly. The plastic may be coated or colored to provide an article of jewelry.

The medical information on the film 13 is protected as in the lens 15 when the pendant is constructed as described herein.

The exterior of the jewelry capsule 12 may be decorated in any manner desired for appearance.

I claim:

1. An article of jewelry comprising a pendant in the form of an elongated capsule, and capsule having a cavity longitudinally throughout the interior thereof, a magnifying lens fixedly mounted vertically within said capsule near one end thereof and recessed from said end, a film module having a ridge extending exteriorly around the circumference thereof, said module being hollow with one end closed by a light distributing translucent material, a groove extending interiorly around the circumference thereof, a film containing terms for identification and medical history of the person to be wearing said article, said film being retained in said groove within said module, said cavity within said capsule having an annular groove adjacent the open end thereof and having an inner diameter equal to the outer diameter of said annular ridge, whereby said module may be snapped into place within said capsule and said film will be precisely at the focal point of said lens, said capsule being air and moisture tight between said lens and said film when said module is within said capsule.

2. The article of jewelry of claim 1 in which said cavity within said capsule has an increase in diameter near the end thereof opposite said lens establishing a shoulder extending circumferently around said cavity.

* * * * *